United States Patent [19]

Orain et al.

[11] 4,232,080
[45] Nov. 4, 1980

[54] SAFETY WINDOW COMPRISING SELF-HEALING POLYMERIC LAYER

[75] Inventors: Roger Orain, Vaucresson, France; Hans Heuser; Hans Ohlenforst, both of Aachen, Fed. Rep. of Germany; Rudolf Pelzer, Herzogenrath, Fed. Rep. of Germany

[73] Assignee: Saint-Gobain Industries, Neuilly-sur-Seine, France

[21] Appl. No.: 776,214

[22] Filed: Mar. 10, 1977

Related U.S. Application Data

[63] Continuation of Ser. No. 369,087, Jun. 11, 1973, abandoned.

[30] Foreign Application Priority Data

Jun. 9, 1972 [DE] Fed. Rep. of Germany ....... 2228299

[51] Int. Cl.$^2$ ................ B32B 17/10; B32B 27/40; C03C 17/32; C03C 27/12
[52] U.S. Cl. .................................. 428/215; 156/99; 156/105; 296/84 K; 427/389.7; 428/437; 428/334; 428/335; 428/336; 428/339; 428/425.6
[58] Field of Search ............... 428/437, 425, 334, 335, 428/336, 339, 215; 156/99, 105; 296/84 R; 427/385 A

[56] References Cited

U.S. PATENT DOCUMENTS

| 3,282,772 | 11/1966 | Davis | 428/437 |
| 3,458,388 | 7/1969 | Moynihan | 428/437 |
| 3,764,457 | 10/1973 | Chang | 428/425 |
| 3,781,184 | 12/1973 | Domicone | 156/306 |
| 3,806,387 | 4/1974 | Peetz et al. | 156/102 |
| 3,808,077 | 4/1974 | Rieser et al. | 428/425 |
| 3,867,235 | 2/1975 | French et al. | 351/166 |

FOREIGN PATENT DOCUMENTS

| 916832 | 12/1972 | Canada | 428/425 |
| 1370480 | 11/1970 | United Kingdom | 428/425 |

Primary Examiner—J. C. Cannon
Attorney, Agent, or Firm—John T. Synnestvedt; Alexis Barron

[57] ABSTRACT

A safety window comprises at least one sheet of glass, which may be tempered, and, on the side thereof facing a interior of the vehicle in which the window is to be mounted, a sheet of transparent plastic material bonded adhesively thereto, the plastic material possessing a high capacity of elastic deformation, a modulus of elasticity below 2,000 daN/cm$^2$ and an elongation to rupture in excess of 60% with less than 2% plastic deformation, the plastic material having self-healing properties and capable of protecting occupants of the vehicle from being cut if said sheet of glass is broken.

19 Claims, 2 Drawing Figures

SAFETY WINDOW COMPRISING SELF-HEALING POLYMERIC LAYER

CROSS REFERENCE TO RELATED APPLICATION

This is a continuation of application Ser. No. 369,087, filed June 11, 1973, now abandoned.

FIELD OF THE INVENTION

The present invention relates to safety glass and especially to a windshield for use in an automotive vehicle and having a high resistance to impact. The safety glass of the present invention is of the type in which a glass sheet has thereon a transparent plastic material which, in case of collision and breakage of the windshield, protects passengers of the vehicle from being cut by sharp edges of broken glass.

REPORTED DEVELOPMENTS

At the present time, the most widely used automotive windshield is a laminated structure comprising an energy absorbing plastic sheet sandwiched between two glass sheets. Such windshields are capable of receiving a blow from the head of an occupant of the vehicle without being perforated and, in so functioning, they absorb a relatively high amount of energy and accommodate considerable travel of the head as the windshield undergoes an essentially plastic deformation.

Although the energy absorbing plastic sheet in such windshields functions to keep an occupant's head from perforating the outside sheet of glass of the windshield, thereby preventing serious injury or death, a disadvantage of the windshield is that an occupant is nevertheless subjected to facial lacerations from sharp edges of broken glass of the inner glass sheet comprising the windshield. To cope with this problem, it has been proposed to coat or cover the inside glass surface of the windshield with a protective coating of plastic material which prevents the occupant's skin from coming into contact with the glass.

In one prior art embodiment, the layer of plastic comprises a sheet of amorphous polyamide some 0.3 mm thick. In another prior art embodiment, a sheet of tempered glass has bonded thereto a sheet of plastic material such as polycarbonate, polyacrylate, cellulose acetate, polyester, poly(vinylchloride) or the like.

Although the aforementioned prior art developments give effective protection against lacerations, the aforementioned plastics have the shortcoming that they are not sufficiently scratch resistant. Accordingly, it is known to protect them by the use of a scratch resistant coating applied to their exposed surface.

Another shortcoming of such prior art developments is that the plastic materials are such that, for the thickness usually employed, they have a tendency to resist deformation, and in particular elongation. This limits the energy absorption capacity of the windshield. It is for this reason that the aforementioned prior art structure which includes a plastic material bonded to tempered glass is designed so that the edge of the plastic sheet is wholly or partly outside the windshield frame.

It is an object of the invention to provide a laminated window which can be fastened tightly along the edges thereof, for example into a frame, and which has good energy absorbent properties, and which includes a plastic layer which is effective in protecting vehicle passengers against lacerations, and which is also scratch resistant so that it is unnecessary to use an additional material or coating to protect the plastic layer from being scratched.

SUMMARY OF THE INVENTION

According to the invention, there is provided a safety window which includes a plastic layer made of a material having a high capacity for elastic deformation, a low modulus of elasticity, below 2,000 daN/cm$^2$, and also a high capacity of elongation before rupture by tearing, above 60% with less than 2% plastic deformation. Particularly good results have been obtained with plastic materials having a modulus of elasticity below 1,200 daN/cm$^2$ and an elongation to rupture by tearing of in excess 70% with less than 1% plastic deformation.

Applicants have found unexpectedly that a sheet of plastic material possessing the properties set forth above fulfills perfectly and simultaneously two important functions. For one, the high deformation capacity of the plastic sheet is such that even when there is severe local flexing or folding thereof after rupture of the glass, the plastic sheet does not tear, but continues to form a protective screen which protects the skin of an occupant impacting against the windshield from broken jagged edges of glass. Secondly, the aforementioned plastic material has self-healing properties from which, after a short time, surface defects produced by scratches or local indentations heal over completely. Hence the planar nature of the surface is restored rapidly. Contrary to what might be supposed, the high elastic deformability of such materials does not make them vulnerable to surface damage. Instead, it confers on them a particularly high effective durability due to the fact that injuries thereto quickly heal over and disappear.

Among known plastic materials having the properties indicated above and suitable for use in the window of the invention as the uncoated plastic sheet on the inside of the window, there may be cited in particular a weekly reticulated aliphatic polyurethane. It is an advantage of this material that it possesses in itself a high enough adhesiveness to make it possible to apply and to bond a sheet of this material directly to the surface of the glass toward the inside of the window without applying a separate coating of adhesive.

DESCRIPTION OF PREFERRED EMBODIMENTS

Figure 1:
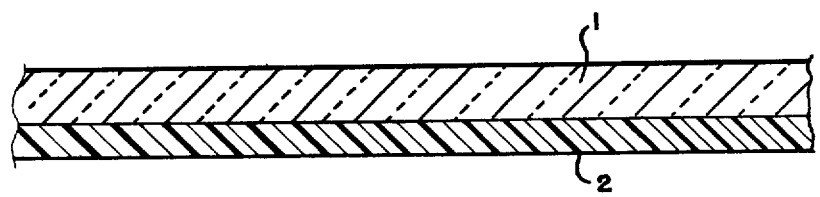
FIG. 1 is a fragmentary sectional view of a window in accordance with the invention.

The embodiment of the invention shown in FIG. 1 comprises a single glass sheet 1, which may be of tempered glass, and a single plastic layer 2. This layer has the aforementioned characteristics, that is, high capacity of elastic deformation, a modulus of elasticity below 2,000 daN/cm$^2$, and an elongation to rupture in excess of 60% with less than 2% plastic deformation. A weakly reticulated aliphatic polyurethane is one suitable material for the plastic sheet 2. In an embodiment such as that shown in FIG. 1, which includes a single glass sheet, the plastic sheet 2 desirably possesses a thickness greater than 1 mm.

Figure 2:
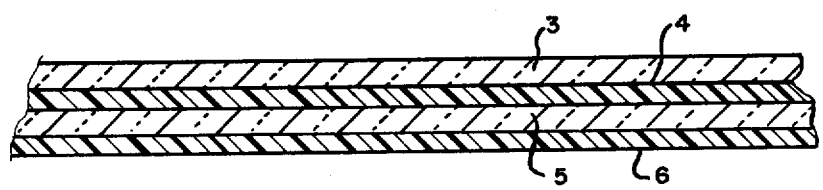
FIG. 2 is a fragmentary sectional view of another window in accordance with the invention.

FIG. 2 illustrates an embodiment of the invention which is a laminated safety glass window or windshield which is resistant to perforation. The window comprises outer and inner sheets 3 and 5 of silicate glass of normal thickness. Thus, the outer sheet 3 may have for example have a thickness of 3 to 4 mm, whereas the inner sheet 5 may, a thickness of 2 to 3 mm. The two glass sheets 3 and 5 are adhesively bonded together with a thermoplastic layer 4 of poly(vinyl butyral) whose thickness should be at least 0.76 mm.

In the event of collision, deformation of the intermediate layer 4 of poly(vinyl butyral) makes it possible to absorb the energy of impact, for example, of the passenger's head against the window, without perforation of the window.

On that side of the windshield facing the interior of the vehicle, that is, on the side of the thinner glass sheet 5, which is remote from the thicker glass sheet 3, the windshield further comprises a deformable plastic sheet 6 having a thickness between 0.1 and 1 mm, and preferably between 0.2 and 0.5 mm. The function of the plastic sheet 6 is to provide protection against lacerations. A particular advantage of the embodiment of FIG. 2 resides in the ease of fabrication thereof since it requires nothing further than the application of the plastic coating 6 to a laminated window or windshield of standard type.

The plastic sheet 6 possesses high capacity of elastic deformation, a modulus of elasticity below 2,000 daN/cm$^2$, and an elongation to rupture in excess of 60% with less than 2% plastic deformation. A material particularly suitable for the plastic sheet 6 of the embodiment shown in FIG. 2 is a weakly reticulated aliphatic polyurethane possessing the following properties at room temperature:

| | |
|---|---|
| Modulus of elasticity (for low deformations) | 1,000 daN/cm$^2$ |
| intermediate modulus of deformation (for high deformation | 2,000 daN/cm$^2$ |
| Elongation to rupture | 100% |
| resistance to rupture on traction | 100 daN/cm$^2$ |
| fraction of elongation to the point of rupture represented by plastic deformation | 2% |

The plastic layer 6 may be laid down on the glass sheet 5 in the form of a liquid which can thereafter be polymerized by heating. It can also be laid down in the form of a sheet which is fastened to the glass sheet 5 by known adhesive procedures, either with the help of a coating of adhesive, or by action of heat, or by making the sheet 6 itself adhesive with the help of an appropriate activator or solvent.

Whereas the invention has been described with reference to the windows or windshields of automotive vehicles, it is applicable in numerous other environments where safety is desired and where it is desired in particular to prevent penetration in the event of impact and contact between the skin of persons and the sharp edges of the glass.

Moreover, the invention is not limited to the particular embodiments hereinabove described, but rather comprehends all modifications of and departures from those embodiments properly falling within the scope of the appended claims.

In this specification, "daN/cm$^2$" is the abbreviation for decanewton per square centimeter.

We claim:

1. Safety glass characterized by its ability to protect against broken glass laceration and by its ability to absorb the energy of an object impacting against the safety glass throughout a substantial plastic deformation occurring during such impact, said safety glass being transparent and having an elastic plastic layer adhered to the interior surface of a safety glass construction composed of exterior and interior sheets of glass between which there is a layer of an energy absorbing plastic, said interior elastic plastic layer being transparent, anti-lacerative and self-healing and which, during such impact, exhibits an elastic deformation without rupture sufficient to protect against broken glass laceration throughout a substantial plastic deformation of the safety glass without interfering substantially with the energy absorption of said energy absorbing plastic, said elastic plastic layer having an elongation to rupture in excess of 60% with less than 2% plastic deformation and a modulus of elasticity below 2000 daN/cm$^2$.

2. Safety glass according to claim 1 wherein the thickness of said elastic plastic layer is between 0.1 and 1 mm.

3. Safety glass according to claim 1 wherein the thickness of said elastic plastic layer is between 0.2 and 0.5 mm.

4. Safety glass according to claim 1 wherein said elastic plastic layer has an elongation to rupture in excess of 70% with less than 1% plastic deformation and a modulus of elasticity below 1200 daN/cm$^2$.

5. Safety glass according to claim 4 wherein the thickness of said elastic plastic layer is between 0.2 and 0.5 mm.

6. Safety glass according to claim 4 wherein the thickness of said elastic plastic layer is between 0.1 and 1 mm.

7. Safety glass characterized by its ability to protect against broken glass laceration and by its ability to absorb the energy of an object impacting against the safety glass throughout a substantial plastic deformation occurring during such impact, said safety glass being transparent and having an elastic plastic layer adhered to the interior surface of a safety glass construction composed of exterior and interior sheets of glass between which there is a layer of an energy absorbing plastic, said interior elastic plastic layer being a transparent, anti-lacerative and self-healing weakly reticulated aliphatic polyurethane which, during such impact, exhibits an elastic deformation without rupture sufficient to protect against broken glass laceration throughout a substantial plastic deformation of the safety glass without interfering substantially with the energy absorption of said energy absorbing plastic, and said elastic plastic layer having an elongation to rupture in excess of 60% with less than 2% plastic deformation and a modulus of elasticity below 2000 daN/cm$^2$.

8. Safety glass according to claim 7 wherein said elastic plastic layer has an elongation to rupture in excess of 70% with less than 1% plastic deformation and a modulus of elasticity below 1200 daN/cm$^2$.

9. Safety glass according to claim 8 wherein the thickness of said elastic plastic layer is between 0.2 and 0.5 mm.

10. Safety glass according to claim 8 wherein the thickness of said elastic plastic layer is between 0.1 and 1 mm.

11. A transparent, scratch-resistant, laminated safety windshield for use in a vehicle, characterized by its ability to protect an occupant of the vehicle from broken glass laceration and by its ability to absorb energy throughout a substantial windshield plastic deformation occurring during crash impact of the occupant against the windshield, said windshield having two transparent glass sheets, one of which is of a thickness of 3 to 4 mm, and the other is of a thickness of 2 to 3 mm and is adapted to face the interior of the vehicle, and having two transparent plastic sheets, one of which plastic sheets is an energy-absorbing thermoplastic sheet of poly(vinyl butyral) sandwiched between and adhesively bonding said glass sheets and is of a thickness of at least 0.76 mm, and the other of which plastic sheets is an anti-lacerative, self-healing weakly reticulated aliphatic polyurethane sheet of a thickness between 0.1 and 1 mm and adhered to said other glass sheet, said sheet of polyurethane having an elongation to rupture in excess of 60% with less than 2% plastic deformation and a modulus of elasticity below 2000 daN/cm$^2$ and exhibiting, during such impact, an elastic deformation, without rupture, sufficient to protect against broken glass laceration without interfering substantially with the energy absorption of said energy absorbing sheet of poly(vinyl butyral).

12. A windshield according to claim 11 wherein said sheet of polyurethane has an elongation to rupture in excess of 70% with less than 1% plastic deformation and a modulus of elasticity below 1200 daN/cm$^2$.

13. A windshield according to claim 12 wherein the thickness of said sheet of polyurethane is between 0.2 and 0.5 mm.

14. A windshield according to claim 11 further including an adhesive which bonds said sheet of polyurethane to said other glass sheet.

15. A process involving a new use for a known material in which the known material is used in the fabrication of a transparent, laminated, safety glass for use in a vehicle, the safety glass being composed of interior and exterior transparent glass sheets bonded together by a transparent, energy-absorbing plastic sheet capable of absorbing the energy of an object, impacting against either surface of the safety glass, by essentially plastic deformation occurring throughout a substantial path of travel of said object, the known material being a self-healing and transparent plastic, and having a high capacity for elastic deformation including an elongation to rupture in excess of 60% with less than 2% plastic deformation and a modulus of elasticity below 2000 daN/cm$^2$, said process comprising adhering said known material to the interior surface of the interior glass sheet to provide said interior glass sheet with a self-healing, plastic layer which, during impact, exhibits an elastic deformation, without rupture, sufficient to protect against broken glass laceration without interfering substantially with the energy absorption of said energy absorbing plastic sheet.

16. A process according to claim 15 wherein said known material is adhered to said glass sheet by forming it from a liquid which is applied to said glass sheet and then polymerized.

17. A process according to claim 15 wherein said known material is adhered to said glass sheet by bonding a sheet of the known material to the glass sheet with an adhesive.

18. A process for making safety glass according to claim 15 wherein said known material has a modulus of elasticity below 1200 daN/cm$^2$ and an elongation to rupture in excess of 70% with less than 1% plastic deformation.

19. A process for making safety glass according to claim 15 wherein said known material is a self-healing weakly reticulated aliphatic polyurethane.

* * * * *